United States Patent

[11] 3,571,690

| [72] | Inventor | Voldemar Voldemarovich Apsit<br>ulista V. Latsisa, 2-a, Kv.21, Riga, U.S.S.R. |
|---|---|---|
| [21] | Appl. No. | 770,547 |
| [22] | Filed | Oct. 25, 1968 |
| [45] | Patented | Mar. 23, 1971 |
| [32] | Priority | Oct. 30, 1967 |
| [33] | | U.S.S.R. |
| [31] | | 1193648 |

[54] POWER GENERATING UNIT FOR RAILWAY COACHES
2 Claims, 3 Drawing Figs.

[52] U.S. Cl. .................................... 321/8,
290/3, 307/67
[51] Int. Cl. .................................... H62m 7/00
[50] Field of Search .......................... 321/8;
310/168, 263, 126; 290/1, 3; 307/47, 67, 68

[56] References Cited
UNITED STATES PATENTS

| 552,105 | 12/1895 | Dey............................. | 307/67X |
| 1,289,148 | 12/1918 | Fraser.......................... | 290/31 |
| 1,981,738 | 11/1934 | McNeil......................... | 307/67X |
| 1,985,639 | 12/1934 | King, Jr. ...................... | 307/68X |
| 3,132,272 | 5/1964 | MacFarlane................. | 310/263X |
| 3,319,100 | 5/1967 | Erickson ...................... | 310/168 |
| 3,321,652 | 5/1967 | Opel............................. | 310/168 |

Primary Examiner—William M. Shoop, Jr
Attorney—Waters, Roditi, Schwartz and Nissen ABSTRACT: A power-generating unit for railway coaches which comprises a synchronous electrical machine connected to the coach circuits through a rectifier.

POWER GENERATING UNIT FOR RAILWAY COACHES

The present invention relates to rotary power-generating equipment and more specifically to power units designed to supply DC voltage for railway coaches when in motion and at a standstill.

Widely known in the art is a power-generating unit known as the genemotor which is a combination axle-driven DC generator and induction motor mounted on a common shaft and built into a common frame. The axle-driven generator part of the combination powers all the coach loads and is driven either from a coach axle (when the train is in motion) or by the induction-motor part (when the train is at a standstill).

The disadvantages of such genemotors are large size, heavy weight and low reliability.

An object of the present invention is to reduce the size and weight of the power generating unit and, at the same time, to improve its efficiency and reliability.

A specific object of the present invention is to provide a power generating unit which generates electricity when the train is in motion and which converts AC at power frequency into DC when the train is at a standstill.

These objects of the present invention are achieved by providing a power generating unit for railway coaches, comprising a regulated motor-generator connected to the electric circuit in the coach and having a rotor driven by a coach axle when the train is in motion, in which according to the invention, the motor-generator is a synchronous electrical machine with two armature windings on a common stator, one winding being permanently connected to the load through a rectifier, and the other winding being adapted for connection to an external AC source when the train is at a standstill.

It is preferred to provide reactors in the input circuit of the winding intended for connection to an AC source so as to provide for troublefree operation of the power-generating unit in the case of considerable fluctuations in the supply voltage.

The windings arranged on the common magnetic circuit may be electrically connected to each other.

The invention will be best understood from the following description of a preferred embodiment when read in connection with the accompanying drawings, wherein.

Figure 1:
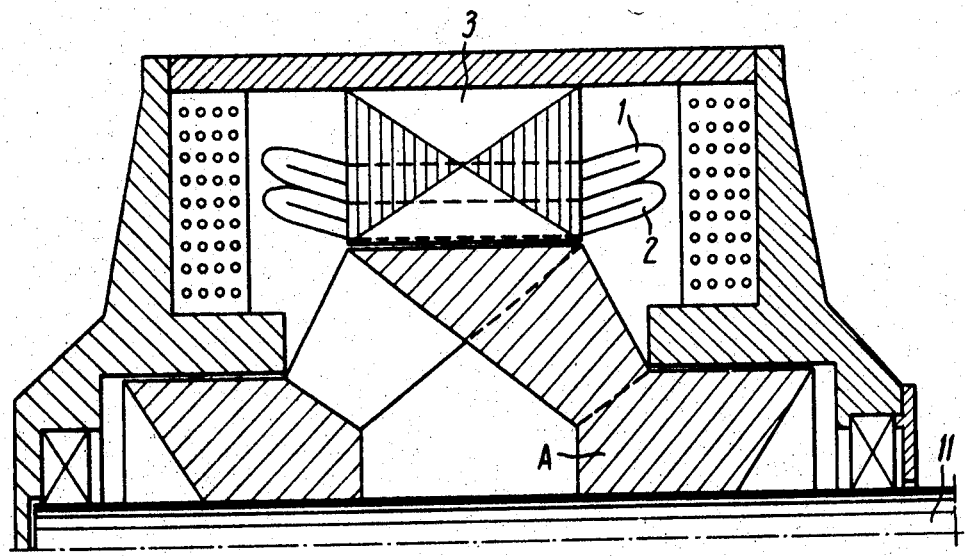
FIG. 1 shows a partial cross-sectional view through a synchronous electrical machine, according to the invention.

The power-generating unit for railway coaches, disclosed herein, comprises a synchronous machine with two armature windings 1 and 2 (FIG. 1) mounted on a stator 3. This machine can operate as a generator when the rotor A is driven by a coach axle (not shown in the drawing) with the train in motion, and as a motor when the winding 2 in energized from an external AC source. In motor operation, the machine is practically a rotary converter.

Figure 2:
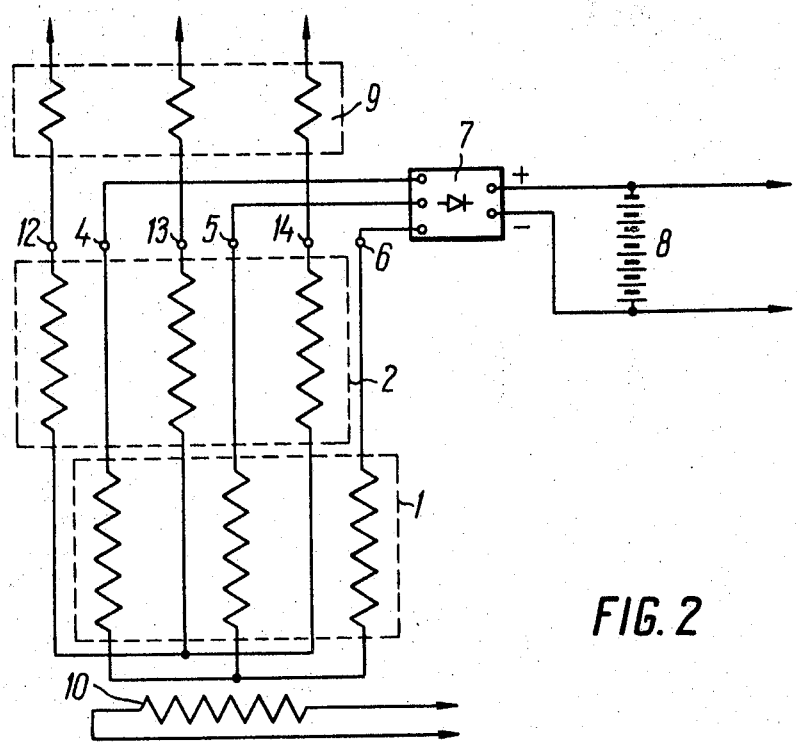
FIG. 2 is a diagram showing connection of a synchronous machine in a power-generating unit, according to the invention.

When the machine is operating as a generator, the winding 1 is an armature winding, and the leads 4, 5 and 6 of this winding (FIG. 2) are permanently connected to a rectifier 7 which delivers a direct current to the coach circuits and also charges a storage battery 8.

The winding 2 is used when the machine is operating as a self-starting synchronous motor. It is held in the same slots as the winding 1, but is designed to be energized by an AC voltage from an external source when the train is at a standstill. The winding 2 is connected to the AC supply source through a three-phase reactor in order to regulate the voltage across the rectifier 7 against variations in the AC source voltage. The field winding 10 is used both when the machine is operating as a motor and when the machine is operating as a generator and is energized from a field regulator (not shown in the drawing). For ease of starting in both cases, the machine may have poles or a starting cage structure.

When the train is travelling at a sufficiently high speed, the synchronous machine operates as an AC generator charging the storage battery 8 through the rectifier 7. In such a case, the winding 2 is idling. When the train is travelling at a slow speed or is at standstill for a short time, the coach loads are fed by the storage battery 8. During extended periods of standstill, the winding 2 is connected to the external three-phase AC source. This produces a starting torque which disengages the clutch (not shown in the drawing) between a shaft 11 (FIG. 1) and a universal joint transmission (not shown in the drawing either), and the rotor of the machine is put into motion. When the machine comes up to a speed close to the synchronous speed, the voltage of the field regulator is automatically applied to the machine, and the rotor pulls into synchronism. At the same time, the voltage across the winding 1 rises to be subsequently maintained at the requisite level by a voltage regulator which, by controlling the field current of the machine, varies the phase and magnitude of the current drawn by the winding 2 from the AC source in such a way that the voltage drop across the reactor 9 is subtracted from the AC source voltage, thereby compensating for its variations. This provides for the constancy of voltage across the terminals 12, 13 and 14 (FIG. 2) of the winding 2 and, consequently, across the winding 1. The regulated voltage is fed through the rectifier 7 to the coach's loads. Thus, the power-generating unit disclosed herein operates as a transformer-type converter and delivers a regulated output voltage.

Figure 3:
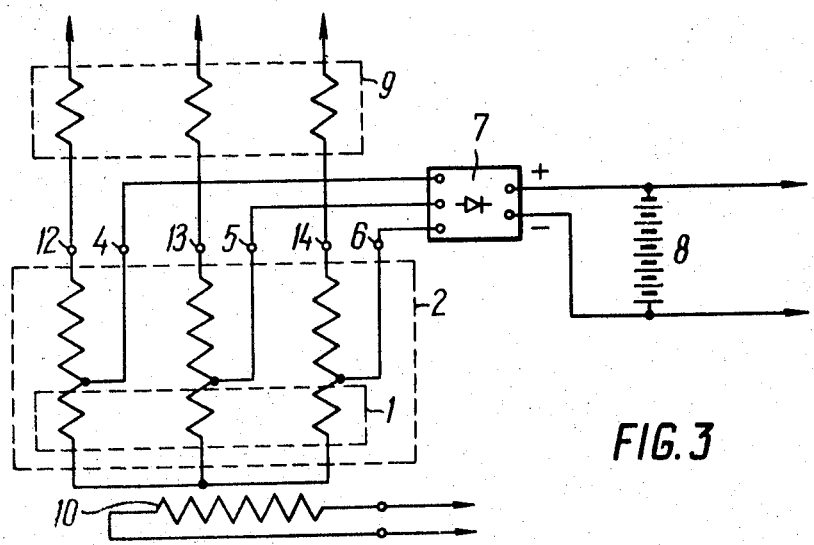
FIG. 3 is a diagram showing connection of a synchronous machine with electrically interconnected windings, in a power generating unit according to the invention.

FIG. 3 shown a diagram in which the windings 1 and 2 are connected in a way differing from the one described above only in that the armature windings 1 and 2 are electrically interconnected, so that the lower-voltage windings are used as part of the higher-voltage windings.

The invention disclosed herein makes it possible to reduce appreciably the size and weight of power-generating units for railway coaches because such a unit uses a single synchronous machine instead of two an induction motor and a DC generator).

I claim:

1. A power-generating unit for railway coaches including a coach axle and coach circuits, said unit comprising a rectifier including an output terminal connected to said coach circuits, and an AC synchronous machine comprising a rotor coupled with said coach axle for being driven thereby when said coaches are in motion, a common stator, and a pair of armature windings connected to said common stator, one of said windings being permanently connected to said coach circuits and said rectifier, and the other of said windings being adapted for connection to an external AC source when said coaches are at a standstill, said pair of armature windings being electrically interconnected, one said winding constituting a lower-voltage winding, and the other said winding constituting a higher-voltage winding, said lower-voltage winding being operable as a part of said higher-voltage winding.

2. A power generating unit as claimed in claim 1 including a three-phase reactor coupled in series with said winding being adapted for connection to an external AC source.